US009804923B2

(12) United States Patent
Karrotu et al.

(10) Patent No.: US 9,804,923 B2
(45) Date of Patent: Oct. 31, 2017

(54) RAID-6 FOR STORAGE SYSTEM EMPLOYING A HOT SPARE DRIVE

(71) Applicant: Dell Products L.P., Round Rock, TX (US)

(72) Inventors: Vishnu Murty Karrotu, Bangalore (IN); Neeraj Joshi, Puducherry (IN); Kavi K. Chakkravarthy, Vellore (IN)

(73) Assignee: Dell Products L.P., Round Rock, TX (US)

(*) Notice: Subject to any disclaimer, the term of this patent is extended or adjusted under 35 U.S.C. 154(b) by 34 days.

(21) Appl. No.: 14/968,037

(22) Filed: Dec. 14, 2015

(65) Prior Publication Data

US 2017/0168896 A1 Jun. 15, 2017

(51) Int. Cl.

| | |
|---|---|
| ***G11C 29/00*** | (2006.01) |
| ***G06F 11/10*** | (2006.01) |
| ***G06F 3/06*** | (2006.01) |

(52) U.S. Cl.

CPC .......... *G06F 11/1076* (2013.01); *G06F 3/064* (2013.01); *G06F 3/0619* (2013.01); *G06F 3/0689* (2013.01)

(58) Field of Classification Search

CPC .... G06F 11/1076; G06F 3/0619; G06F 3/064; G06F 3/0689

See application file for complete search history.

(56) References Cited

U.S. PATENT DOCUMENTS

2016/0019114 A1* 1/2016 Han .................... G06F 11/1076 714/764

* cited by examiner

*Primary Examiner* — Sam Rizk

(74) *Attorney, Agent, or Firm* — Jackson Walker L.L.P.

(57) ABSTRACT

A disclosed method for implementing a RAID-6 virtual disk includes performing data storing operations in response to receiving write data. The data storing operations include, in at least one embodiment: storing a block of the write data in D data stripes distributed across D of N storage devices, where D and N are integers greater than 0 and N is greater than D. The storage devices may correspond to disk drives, but may correspond to other types of storage devices as well

20 Claims, 8 Drawing Sheets

100
NETWORK
150
Data Storage Facility 160
Storage Controller
172
Storage
170
F/W
174
115
NID
140
Storage
120
F/W
124
Storage Controller
122
Device
Interface(s)
136
I/O CTL(s)
130
Output
Device(s)
134
Input
Device(s)
132
Processor(s)
105
System
Memory
110
APPs
118
O/S
116
BIOS
114
F/W
112

200
Storage 120
Group or Span 1 230
SD 1 232
Data 1 250
Stripe A 252
Stripe D 254
Stripe G 256
SD 2 234
Data 1c 260
Stripe A 262
Stripe D 264
Stripe G 266
Hot spare SD 240
STORAGE CONTROLLER 122
CONTROL LOGIC 212
STORAGE MANAGER FIRMWARE 214
HOT SPARE MANAGER FIRMWARE 216
INTERFACE SUBSYSTEM 210

RAID-6 FOR STORAGE SYSTEM EMPLOYING A HOT SPARE DRIVE

TECHNICAL FIELD

The present disclosure generally relates to data storage systems and in particular to a method of implementing a redundant array of independent drives (RAID) storage system.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

An information handling system can be configured in several different configurations. The information handling system can range from a single, stand-alone computer system to a distributed, multi-device computer system, to a networked computer system with remote or cloud storage systems. Both local computer storage systems and remote or cloud storage systems can include redundant arrays of independent drives (RAID) that use hard disk drives or solid state storage drives. Various "levels" of RAID configurations are well known to those in the field of data storage systems.

While the acronym itself suggests that redundancy is a significant feature of RAID systems, only RAID 1 systems and their variants rely extensively upon data redundancy. Apart from RAID 1 systems, most commercially significant RAID configurations attempt to ensure data integrity primarily through the use of parity, which requires significantly less storage capacity than pure redundancy, i.e., duplication. If a parity bit is generated for each 8-bit byte of data, the utilization of a given capacity of storage K is (8/9)*K since only 1 out of every 9 bits is required for parity. In contrast, RAID 1 duplication achieves, at best, 50% utilization and still lower utilization if data is duplicated on two or more redundant drives.

Aside from redundancy vs. parity, a distinguishing characteristic of various RAID systems is the manner in which data is stored on multiple disks. Data may be striped across a set of disks at different levels of granularity. In RAID 3 systems, for example, data is striped across a set of disks at a byte level such that bytes of data that are adjacent from a programming perspective reside on different physical drives. In RAID 4 systems, data is striped at a multi-byte granularity referred to as a block.

Another distinguishing characteristic of RAID levels that employ parity is the manner in which parity information is stored. RAID 3 and RAID 4 systems use a dedicated drive for parity, i.e., all parity is stored on the same drive regardless of which drive the corresponding data is stored on. Because the use of a dedicated parity drive has negative performance implications, RAID 3 and RAID 4 systems are rarely encountered.

RAID 5 employs block level striping of data with a single parity bit (P) per each byte of data being distributed across the same drives as the data. While RAID 5 has good read/write performance relative to RAID 3 and RAID 4 and good utilization relative to RAID 1, RAID 5 parity provides data integrity only to the extent that no two or more drives ever fail at the same time. As long as only one drive fails at a time, lost data can be re-generated from the remaining drives.

RAID 6 is conceptually similar to RAID 5, but generates a second parity bit (Q) for each byte of data such that there are two parity bits (P and Q) for each byte of data. While the generation of the second parity bit (Q) may be non-trivial in terms of processor clock cycles and time, RAID 6 systems provide improved data integrity over RAID 5 systems by providing data integrity in the case of a two-drive failure.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

SUMMARY

Figure 1:
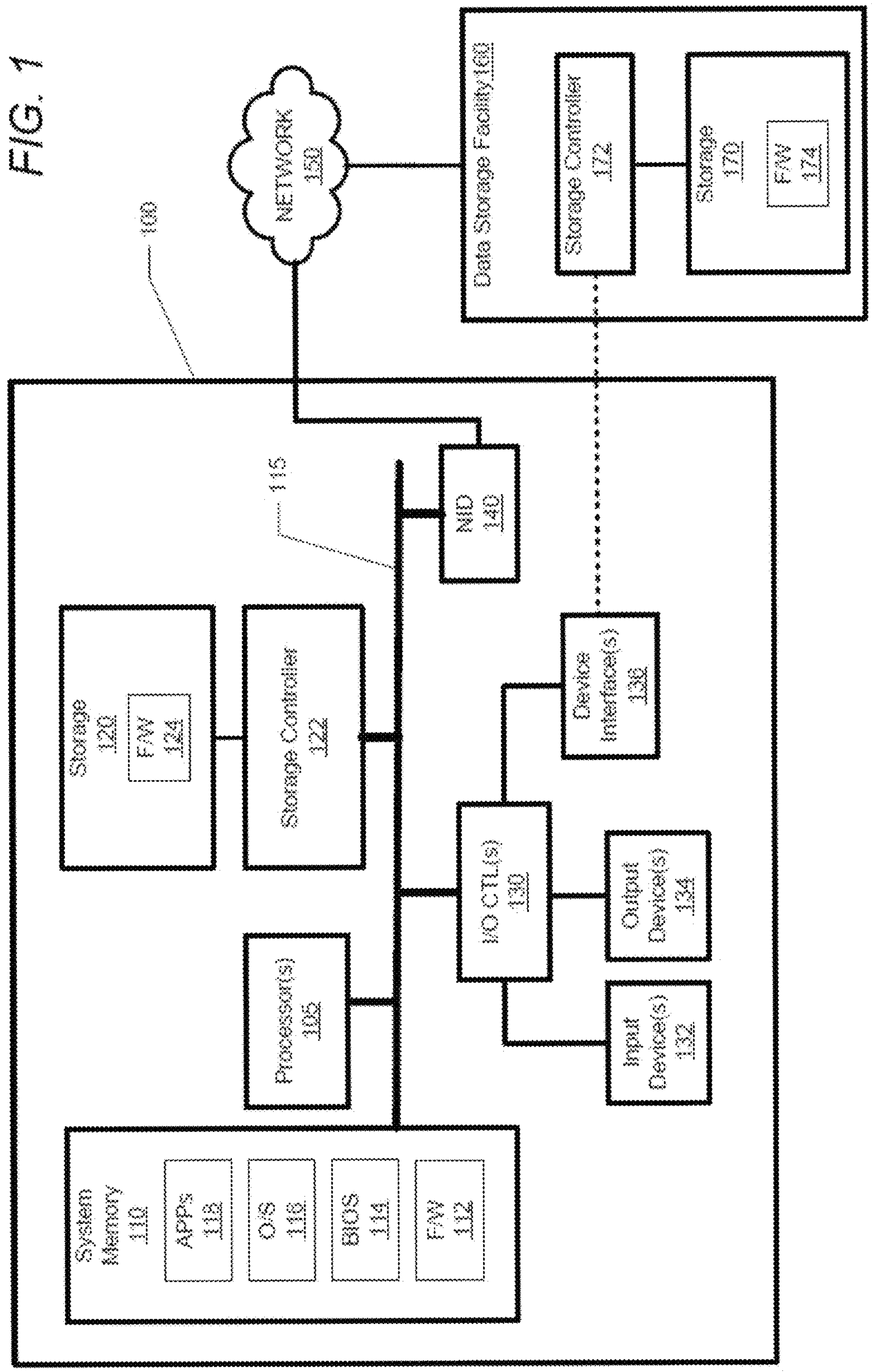
FIG. 1 illustrates an example information handling system (IHS) within which various aspects of the disclosure can be implemented, according to one or more embodiments.

A disclosed method for implementing a RAID-6 virtual disk includes performing data storing operations in response to receiving write data. The data storing operations include, in at least one embodiment: storing a block of the write data in D data stripes distributed across D of N storage devices, where D and N are integers greater than 0 and N is greater than D. The storage devices may correspond to disk drives, but may correspond to other types of storage devices as well.

In at least some embodiments employing RAID-6, N, the total number of storage devices, is two (2) greater than D, the number of storage devices across which a data block is striped. In these embodiments, a block of data is stored on D of N storage devices, a first of the two remaining storage devices stores a first parity syndrome commonly referred to as P parity data and the last remaining storage device stores a second parity syndrome commonly referred to as Q parity data. The P parity data may be generated based on the D data stripes and the Q parity data may be generated based on a combination of the D data stripes and the P parity data.

In addition to the P and Q parity syndromes, a third parity syndrome, referred to herein as Z parity data, may be generated based on a combination of the P parity data and the Q parity data and stored on a hot spare drive in RAID systems that employ a hot spare drive.

Upon detecting a first failed storage device, data regeneration operations may be performed. The data regeneration operations may include determining regenerated write data corresponding to write data, if any, previously stored on the failed storage device. Regenerated write data may be determined based upon a combination of the P parity data and write data stored on the D−1 non-failing storage devices that contain write data.

Regenerated P parity data corresponding to P parity data, if any, previously stored on the failed storage device is determined based on a combination of the Q parity data and the Z parity data. Similarly, regenerated Q parity data corresponding to Q parity data, if any, previously stored on the failed storage device is determined based on a combination of the P parity data and the Z parity data. It will be noted that, regenerating P and Q parity data in this manner beneficially requires only two read operations and a simple 2-input logic operation, e.g., an XOR of P and Z for regenerating Q and an XOR of Q and Z for regenerating P.

Regenerated write data, P parity data, and Q parity data may then be written over the Z parity data previously stored on the hot spare drive. The remaining N−1 original storage devices and the hot spare drive may then be reconfigured as a virtual RAID 6 drive to which the hot spare drive may now be committed.

Generating the P parity data may include performing an XOR of the D data stripes and generating the Q parity data may include performing an XOR of a shifted version of each of the D data stripes. The Z parity data may be generated by performing an XOR of the P parity data and the Q parity data.

The process of generating P, Q, and Z parity data may be repeated for each of a plurality of data blocks included within the write data. Analogous to the manner in which RAID 5 parity data is distributed across multiple storage devices, the P and Q parity data may be distributed across the N storage devices.

Also disclosed is a RAID controller that includes a processor and a computer memory or storage. The computer memory includes processor executable RAID controller instructions that, when executed by the processor, cause the processor to perform RAID controller operations that include: responding to receiving write data by performing storing operations comprising: storing a block of the write data in D data stripes distributed across D of N storage devices, where N is greater than D; generating P parity data based on the D data stripes and storing the P parity data on one of the N storage devices, generating Q parity data based on a combination of the D data stripes and the P parity data and storing the Q parity data on one of the N storage devices, and generating Z parity data based on a combination of the P parity data and the Q parity data and storing the Z parity data on a hot spare drive.

In at least one embodiment, the operations further include responsive to detecting a first failed storage device, performing data regeneration operations comprising: determining, based upon two read operations, regenerated P parity data corresponding to the P parity data, if any, previously stored on the failed storage device; determining, based upon two read operations, regenerated Q parity data corresponding to the Q parity data previously stored on the failed storage device; and overwriting Z parity data previously stored on the hot spare drive with the regenerated P parity data and the regenerated Q parity data.

Also disclosed is a computer readable medium including processor-executable RAID controller instructions for causing a processor to perform operations that include: responding to receiving write data, performing RAID 6 storing operations comprising: storing a block of the write data in D data stripes distributed across D of N storage devices, where N is greater than D, determining P parity data and storing the P parity data on a first of the N storage devices that is different than the D storage devices, and determining Q parity data and storing the Q parity data on a second of the N storage devices that is different than the D storage devices; and generating Z parity data based on a combination of the P parity data and the Q parity data and storing the Z parity data on a hot spare drive.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

DETAILED DESCRIPTION

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which any one or more described features of the various embodiments of the disclosure can be implemented. For purposes of this disclosure, an IHS, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a handheld device, personal computer, a server, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Referring specifically to FIG. 1, example IHS 100 includes one or more processor(s) 105 coupled to system memory 110 via system interconnect 115. System interconnect 115 may be referred to herein as a system bus. Also coupled to system interconnect 115 is a storage controller 122 coupled to storage 120 within which can be stored software and/or firmware 124 and one or more sets of data (not specifically shown). As shown, system memory 110 can include therein a plurality of modules, including firmware (F/W) 112, basic input/output system (BIOS) 114, operating system (O/S) 116 and application(s) 118. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interface(s) 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s), such as a compact disk (CD), digital video disk (DVD), flash drive, or flash memory card. In one or more embodiments, device interface(s) 136 can also provide an integration point for connecting other device(s) to IHS 100. In such implementation, device interface(s) 136 can further include General Purpose I/O interfaces such as I2C, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols.

Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of hard disk drives, solid state storage drives, solid state storage devices or other storage media. In one embodiment, data storage facility 160 is a redundant array of independent storage drives or hard drives (RAID). Data storage facility 160 includes a storage controller 172 coupled to storage 170 within which can be stored software and/or firmware 174 and one or more sets of data (not specifically shown). In an alternate embodiment, and as represented by the second set of dashed interconnecting lines, data storage facility 160 can be directly connected to IHS 100 as an external storage device.

Figure 2:
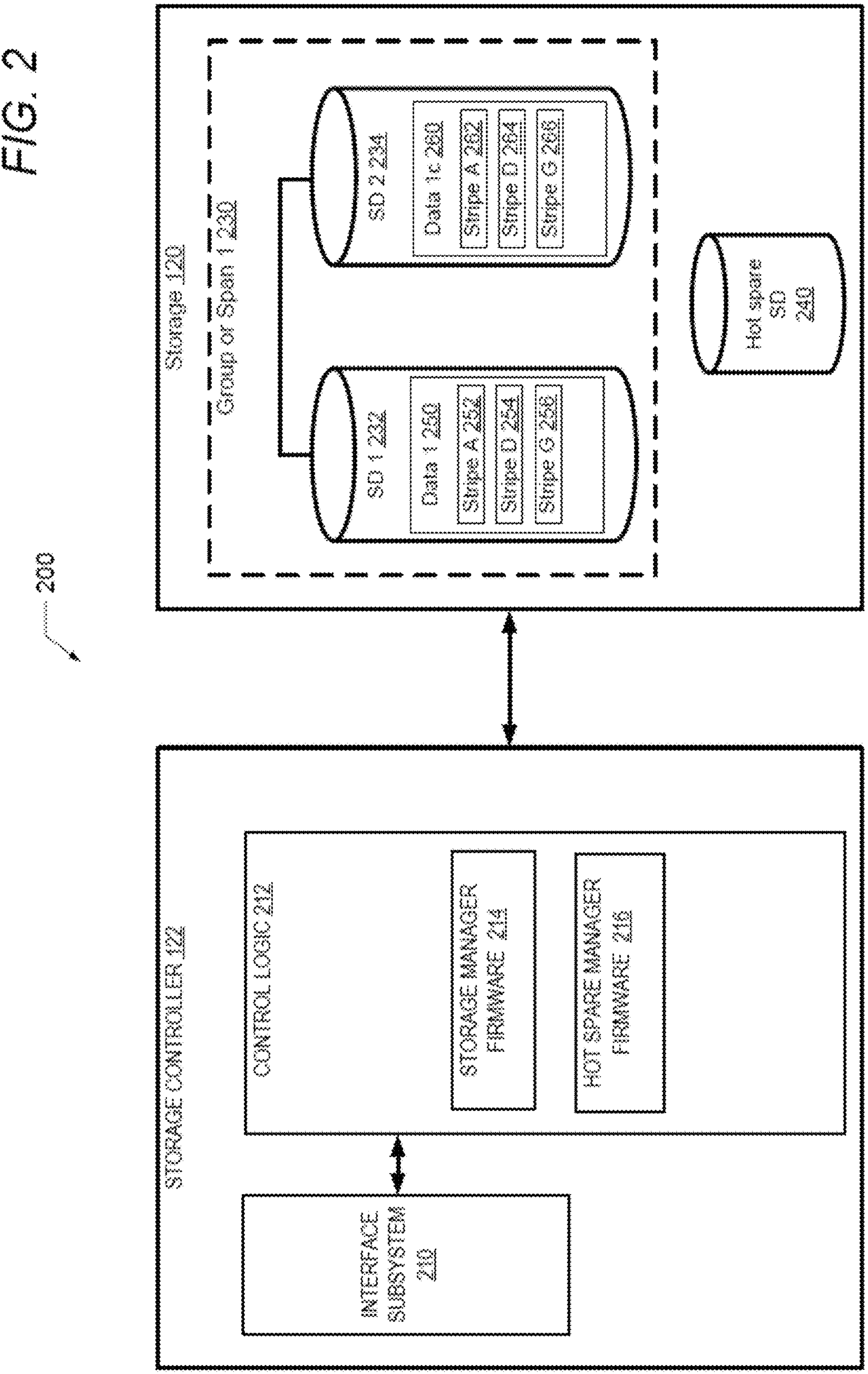
FIG. 2 illustrates a block diagram of an example storage system, in accordance with one or more embodiments.

With reference now to FIG. 2, there is illustrated one embodiment of storage system 200 that can be utilized as a subsystem of IHS 100 and/or data facility 160 to store data, software and firmware. In the discussion of FIG. 2, reference is also made to elements described in FIG. 1. Storage system 200 generally includes storage 120 and storage controller 122 that controls and manages the flow of commands and data to and from storage 120. Storage system 200 can also represent storage 170 and storage controller 172 of data storage facility 160.

In one embodiment, storage 120 comprises a group or span 1 230 of RAID storage devices (SD) or storage drives including SD 1 232 and SD 2 234. While two drives are shown, more or fewer drives can be utilized within group or span 1 230. SD 2 234 contains a copy or mirror image of the data stored in SD 1 232. In some embodiments, storage 120 can include hundreds of groups or spans including many SDs, hard disk drives or solid state drives in each span. SD 1 232 and SD 2 234 are shown storing data in a RAID 1 format. In a RAID 10 format, data is distributed in stripes and copied or mirrored onto a redundant storage device. Striping distributes the contents of files roughly equally among all disks in a set of storage devices. SD 1 232 stores data 1 250 that is comprised of stripe A 252, stripe D 254 and stripe G 256. SD 2 234 stores data 1*c* 260 that is comprised of stripe A 262, stripe D 264 and stripe G 266. SD 2 234 is a mirror of SD 1 232 (i.e., data 1*c* 260 is a copy of data 1 250).

Storage 120 further includes one or more hot spare storage device(s) 240. Hot spare storage device 240 is a storage device that is used to replace a failing or failed storage device in a RAID system. The hot spare disk reduces the mean time to recovery for the RAID redundancy group, thus reducing the probability of a second disk failure and the resultant data loss that would occur in any singly redundant RAID system such as a RAID 1 or RAID 10 system. For example, hot spare storage device 240 can replace either or both of SD 1 232 or SD 2 234 if the storage devices were to fail. Each of the storage devices 232, 234 and 240 can store a wide variety of information and data. According to one aspect of the disclosure, the hot spare storage device 240 is used to store rebuilt data by overwriting the existing data and storing the data of any degraded spans (i.e., group or span 1 230).

Storage controller 122 contains the logic necessary to read and write to storage 120. Storage controller 122 comprises interface subsystem 210 and control logic 212. Interface subsystem 210 manages communications between control logic 212 of data storage facility 160 and system interconnect 115 (FIG. 1). Control logic 212 comprises several functional modules or processes including storage manager firmware 214 and hot spare manager firmware 216. Each of the storage controller components can communicate with each other via a communication fabric, which includes specific messaging signals communicated over specific signal lines (not illustrated). Functions, modules, routines, methods and processes of the present disclosure can be provided as firmware code and/or logic within storage controller 122. The firmware code and logic can implement storage manager firmware 214 and hot spare manager firmware 216.

Storage manager firmware 214 manages the reading and writing of data to storage 120 and can include data distribution techniques to improve storage reliability such as RAID. Storage manager firmware 214 uses RAID technology to group the drives within storage 120 into RAID sets. Hot spare manager firmware 216 manages the rebuilding of data in hot spare storage device 240 when one or more storage devices within storage 120 fail.

Those of ordinary skill in the art will appreciate that the hardware components and basic configuration depicted in FIGS. 1 and 2 and described herein may vary. For example, the components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 3:
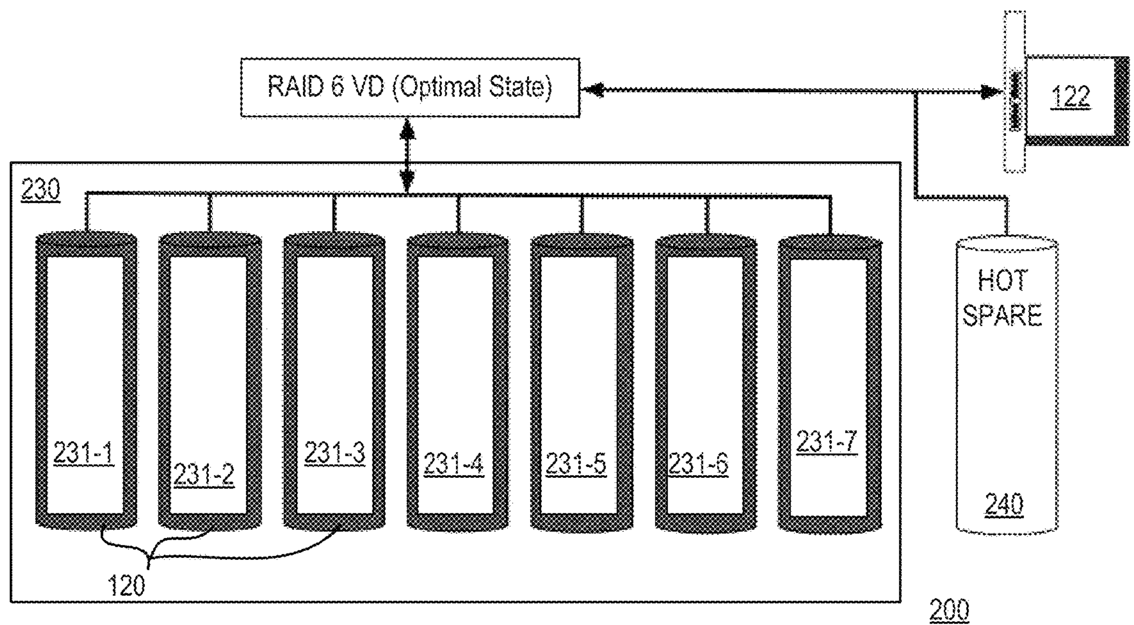
FIG. 3 illustrates a RAID-6 storage system including a RAID controller coupled to a RAID-6 virtual disk and a hot spare drive.

FIG. 3 illustrates an implementation of a RAID-6 storage system 200 that includes a RAID controller 122 coupled to storage 120 comprised of a RAID-6 virtual disk 230 and a hot spare drive 240. The virtual disk 230 illustrated in FIG. 3 includes storage devices 231-1 through 231-7 where, for any particular sufficiently sized block of data, five of the seven storage devices 231 are used for storing stripes of block data, one of the seven storage devices is used to store P parity, and the remaining one of the seven storage devices 231 is used for storing Q parity. Although the virtual disk 230 illustrated in FIG. 3 employs seven storage devices 231, including five storage devices for data and two storage devices parity disks, other embodiments may employ more or fewer than the five data disks shown in FIG. 3.

Figure 4:
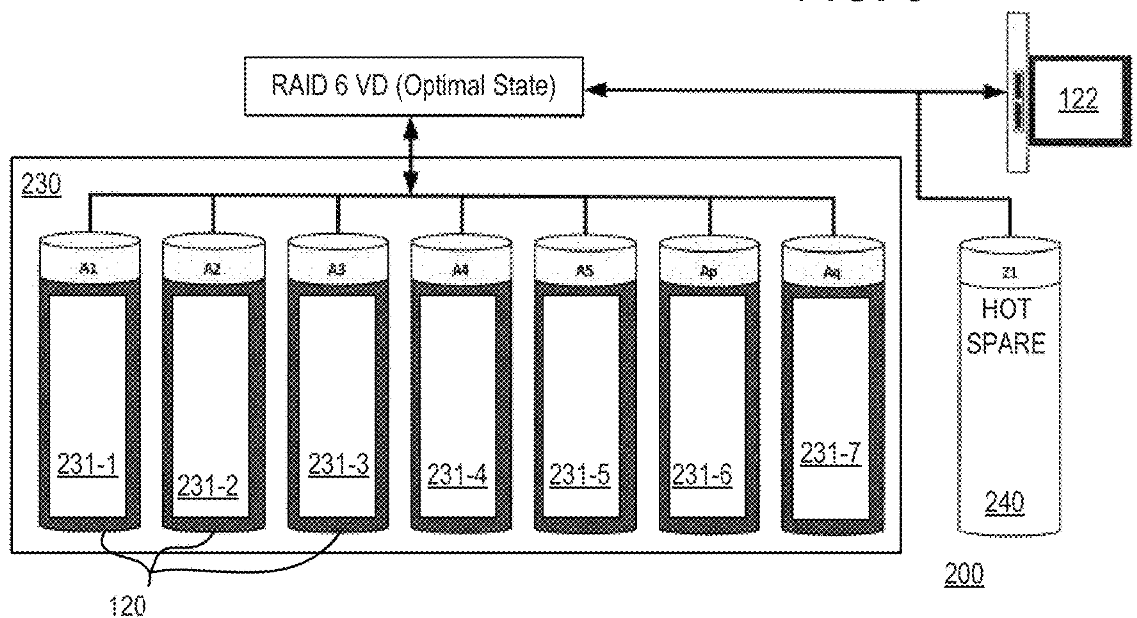
FIG. 4 illustrates the storage system of FIG. 3 after a first block of data and corresponding P and Q parity data are striped across the seven drives of the virtual disk while a Z parity bit is stored in the hot spare drive.

Referring now to FIG. 4, a block of data "A" is striped across storage devices 231-1 through 231-5, with the P parity data for block "A" stored on storage device 231-6 and the Q parity data for block "A" stored on storage device 231-7. In addition, FIG. 4 illustrates a third parity syndrome, referred to herein as the Z parity data, stored on the hot spare drive 240.

In at least one embodiment, the P parity data is generated in a conventional manner based upon an XOR of the program data stored in the five data stripes A1-A5 on storage devices 231-1 through 231-5. The Q parity data on storage device 231-7 may be generated using any of various techniques for generating a Q parity syndrome in RAID-6 configurations. See, e.g., Anvin, H. Peter "The Mathematics of RAID-6" Kernel.org (Linux kernel organization, May 21, 2009), which is herein incorporated by reference in its entirety. Q parity data may be generated based on a function that employs a Galois field wherein the Q parity data may be generated based on a combination of the P parity data and a logically shifted version of the data stripes. In at least one embodiment, the Z parity on storage device 240 is simply the XOR of the P parity data and the Q parity data on storage devices 231-6 and 231-7 respectively.

Figure 5:
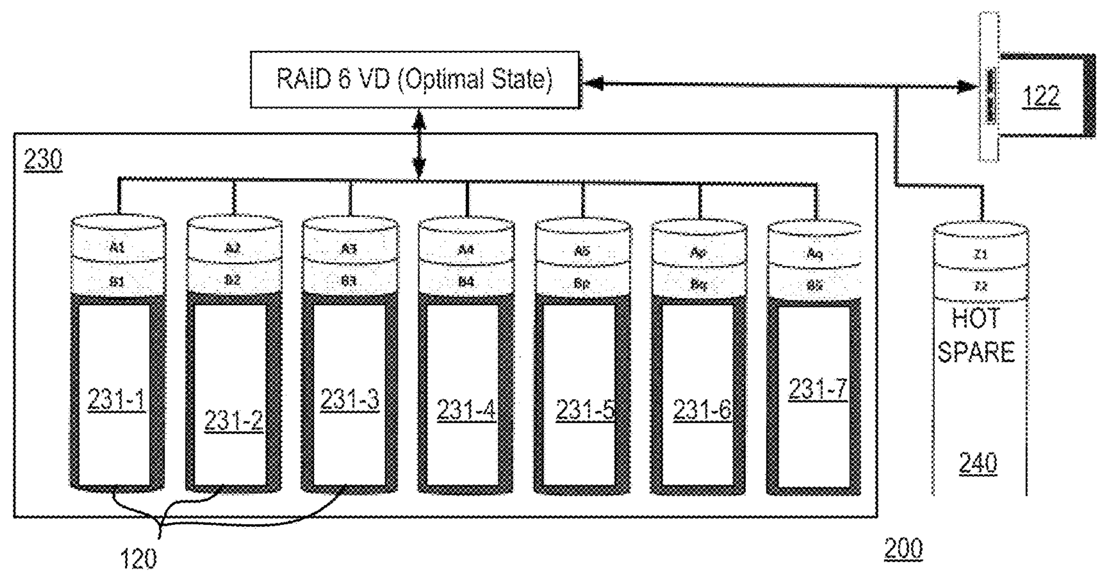
FIG. 5 illustrates the storage system of FIG. 4 after a second block of data and corresponding P, Q, and Z parity data are striped across the virtual disk and hot spare drive.

FIG. 5 illustrates a second block of data "B" striped across storage devices 231-1 through 231-4 and 231-7 with storage device 231-7 functioning as the fifth data disk, while the P parity data is illustrated stored on storage device 231-5, the Q parity data is illustrated stored on storage device 231-6, and the Z parity data stored in the hot spare drive 240.

Figure 6:
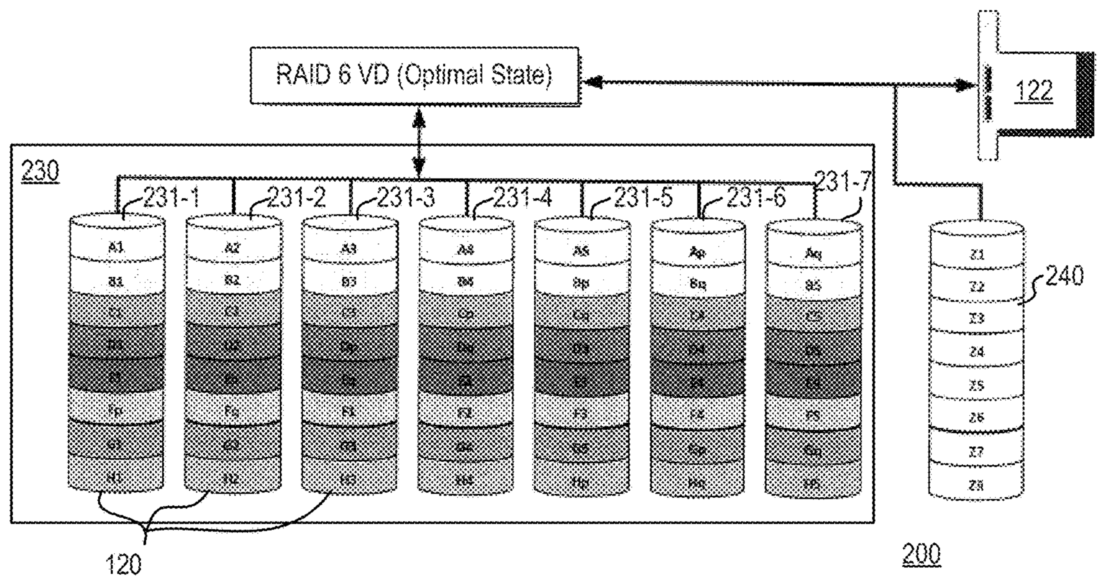
FIG. 6 illustrates the storage system of FIG. 5 after eight blocks of data and corresponding P, Q, and Z parity data have been striped across the virtual disk and hot spare drive.

FIG. 6 illustrates the state of storage 120 and virtual disk 230 after eight blocks of data, including block "A" through block "H", have been striped across the storage devices 231 in the illustrated manner, with the P parity data and Q parity data stored striped across the seven storage devices 231 as illustrated and with the Z parity data stored on hot spare drive 244 for all eight data blocks.

Figure 7:
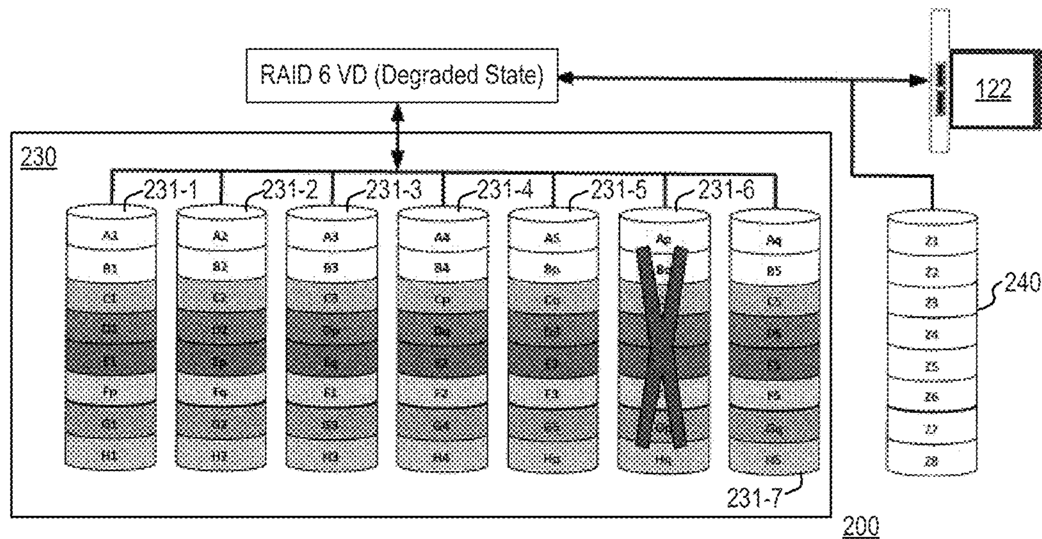
FIG. 7 illustrates the storage system of FIG. 6 after one of the seven drives of the virtual disk has failed.

FIG. 7 illustrates the storage 120 and virtual disk 230 of FIG. 6 with one of the seven drives, storage device 231-6, failing. As illustrated in FIG. 7, storage device 231-6 stores P parity data for block "A" and block "G", Q parity data for block "B" and "H" blocks, and stripe 4 of program data blocks C, D, E, and F.

Figure 8:
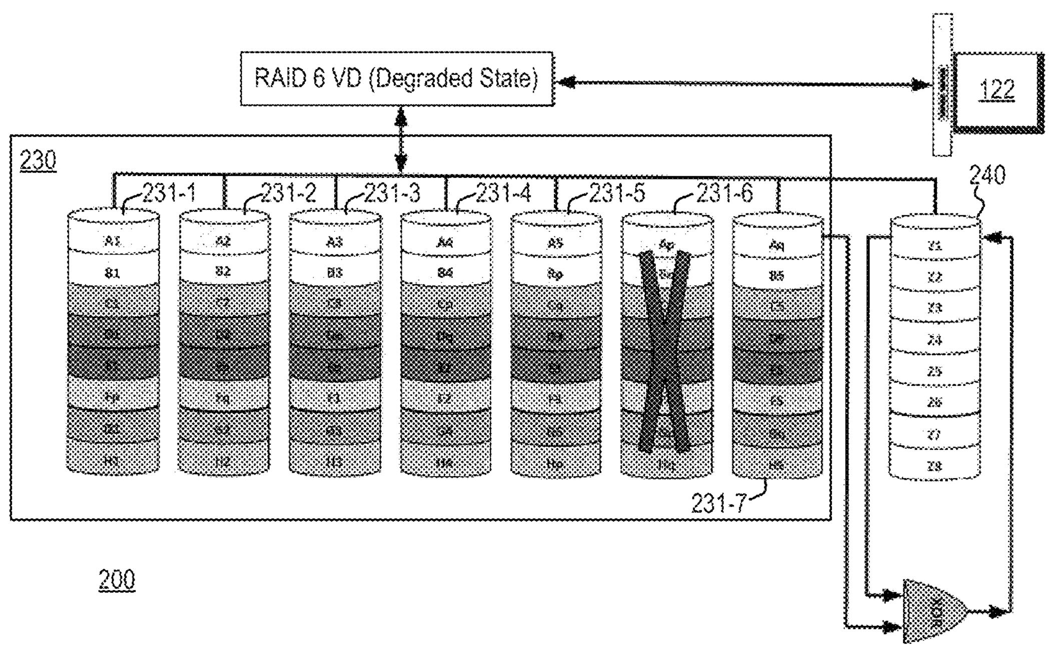
FIG. 8 illustrates a first regeneration phase in which P parity data on the failed drive is regenerated from the Q parity data and the Z parity data and written onto the hot spare drive over the Z parity data.

FIG. 8 illustrates recovery of the program and parity data previously stored in storage device 231-6. More particularly, since stripe 1 of the failed stored device 231-6 contained P parity data for block "A", FIG. 8 illustrates the generation of P parity data for stripe 1 by performing an XOR of the stripe 1 Q parity data in storage device 231-7 and the stripe 1 Z parity data stored in hot spare drive 240. After regenerating the P parity data, the regenerated P parity data is stored on the hot spare drive 240 over previously-stored stripe 1 Z parity data. After regeneration of the P parity data for block "A", the A block program data and parity data previously stored in the first stripe portions of storage devices 231-1 through 231-7 is now stored in the first stripe portion of storage devices 231-1 through 231-5 and 231-7 and hot spare drive 240.

Figure 9:
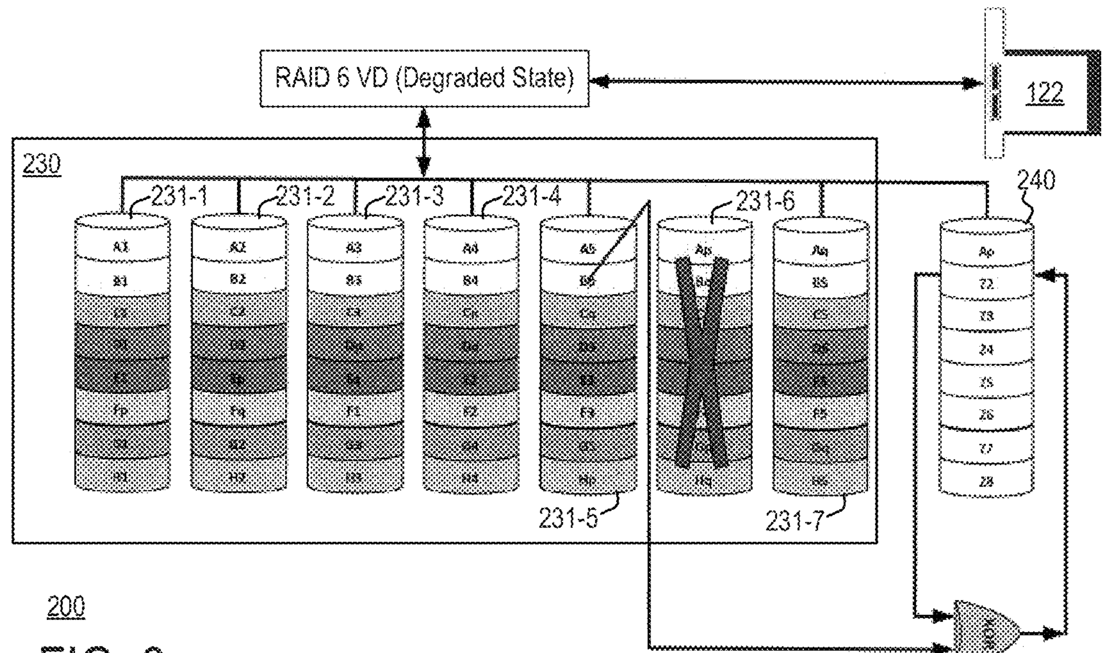
FIG. 9 illustrates a second regeneration phase in which Q parity data on the failed drive is regenerated from the P parity data and the Z parity data and written onto the hot spare drive over the Z parity data.

FIG. 9 illustrates the regeneration of the Q parity data for block "B", previously stored in the stripe 2 portion of storage device 231-6. As illustrated in FIG. 9, the B block Q parity data is regenerated by performing an XOR of the block B P parity data, which is illustrated stored in the stripe 2 portion of storage device 231-5 with the block B portion of the Z parity data stored in the second stripe of hot spare drive 240. As illustrated in FIG. 8 and FIG. 9, the recovery of P parity data and Q parity data is achieved with essentially the same process where the Z parity data has been generated based on an XOR of the P and Q parity data. Note that in the case of conventional RAID 6 configurations that lack Z parity data, the Q parity data could only be regenerated by reading all of the applicable program data blocks on storage devices 231-1 through 231-4 and 231-7 and then performing a Galois mathematical calculation to create the Q parity data. Accordingly, it will be readily apparent that the two read operations followed by a single XOR of two inputs to re-create Q parity data represents considerable processing savings over existing techniques for regenerating Q parity data in a RAID-6 configuration.

Figure 10:
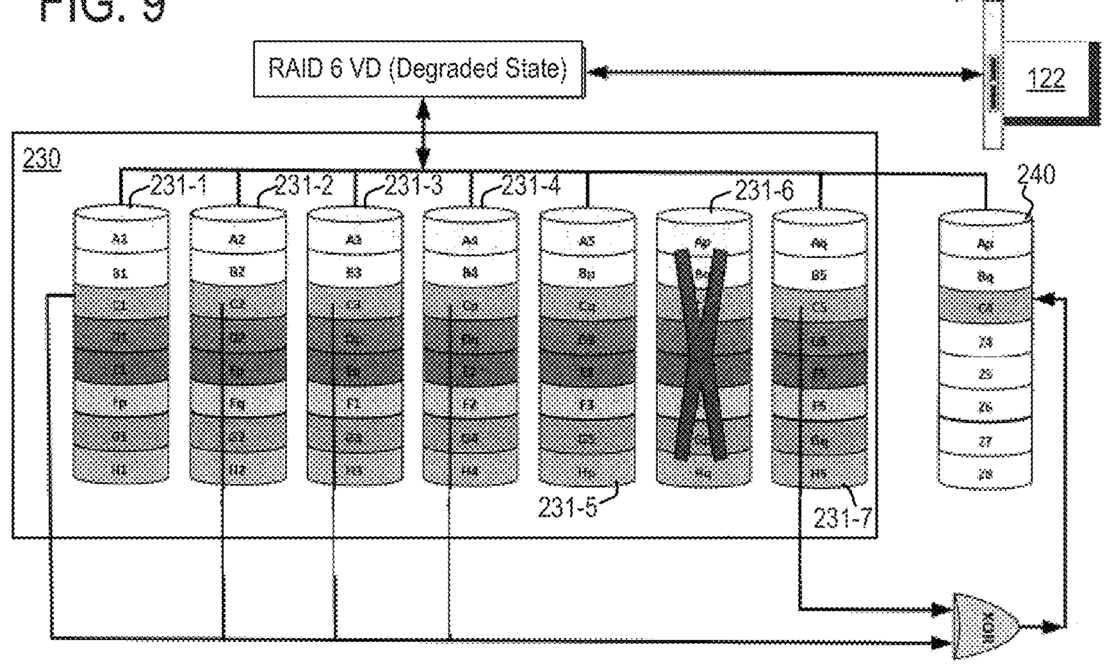
FIG. 10 illustrates a third regeneration phase in which a stripe of block data on the failed drive is regenerated from the P parity data and the other stripes of the block data and written onto the hot spare drive over the Z parity data.

FIG. 10 illustrates the regeneration of program data that was originally stored on the failing storage device 231-6. More particularly, FIG. 10 illustrates the generation of C block program data, originally stored on stripe 3 of storage device 231-6 by XORing all of the C block data stripes on the storage devices that remain operational, including storage devices 231-1 through 231-3 and storage device 231-7, all of which contain a stripe of C block data. When all but one portion of the C block of data is XOR together with the corresponding P parity data, in this case taken from the third stripe of storage device 231-4, the output of the XOR equals the portion of C block data that was originally stored on the storage disk that failed, in this case storage device 231-6. FIG. 10 thus illustrates that regeneration of program data originally stored on a failing storage device is achieved with D read operations and a D+1 input XOR operation where D is the number of storage devices across which each block of program data is striped. This is substantially the same process that would be required in conventional RAID-6 configurations and therefore, represents no performance or regeneration penalty over existing implementations.

Figure 11:
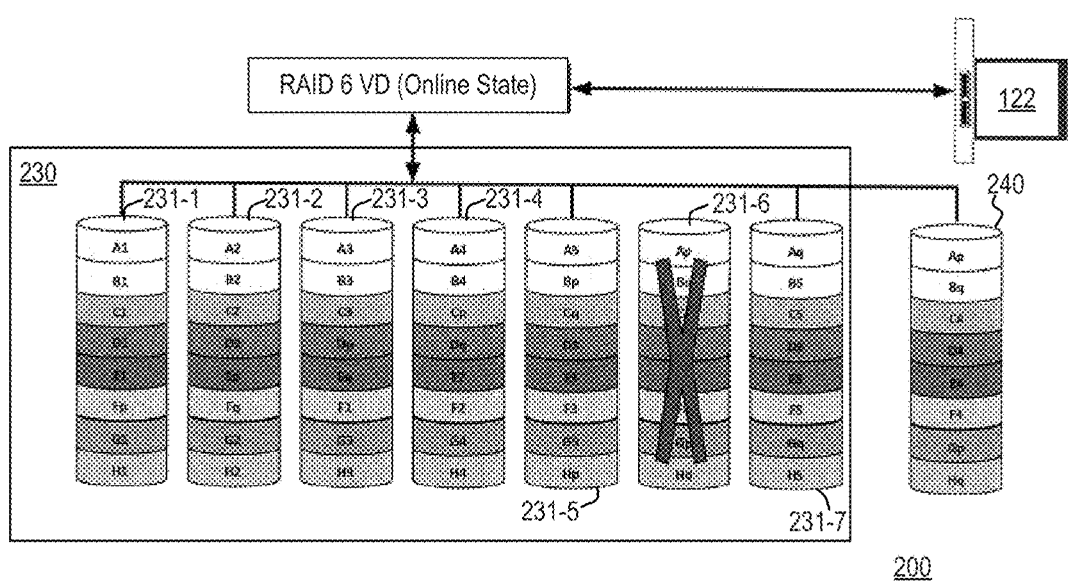
FIG. 11 illustrates the virtual disk after completion of the regeneration process.

FIG. 11 shows the storage 120 after a complete regeneration of the data originally stored on storage device 231-6 where the original data has been fully regenerated and stored back to the hot spare drive 240. Moreover, these examples show that the use of the Z parity data results in a significant improvement in regeneration performance when regenerating the P parity data and even more so with respect to Q parity data while maintaining essentially the same regeneration performance with respect to regenerating program data. Thus, in the illustrated example in which five of seven storage devices 231 are used for data and two of the seven storage devices are used for parity data, regenerating a failed disk will be at essentially the same performance with respect to 5/7 of the data and significantly improved with respect to 2/7 of the data.

Figure 12:
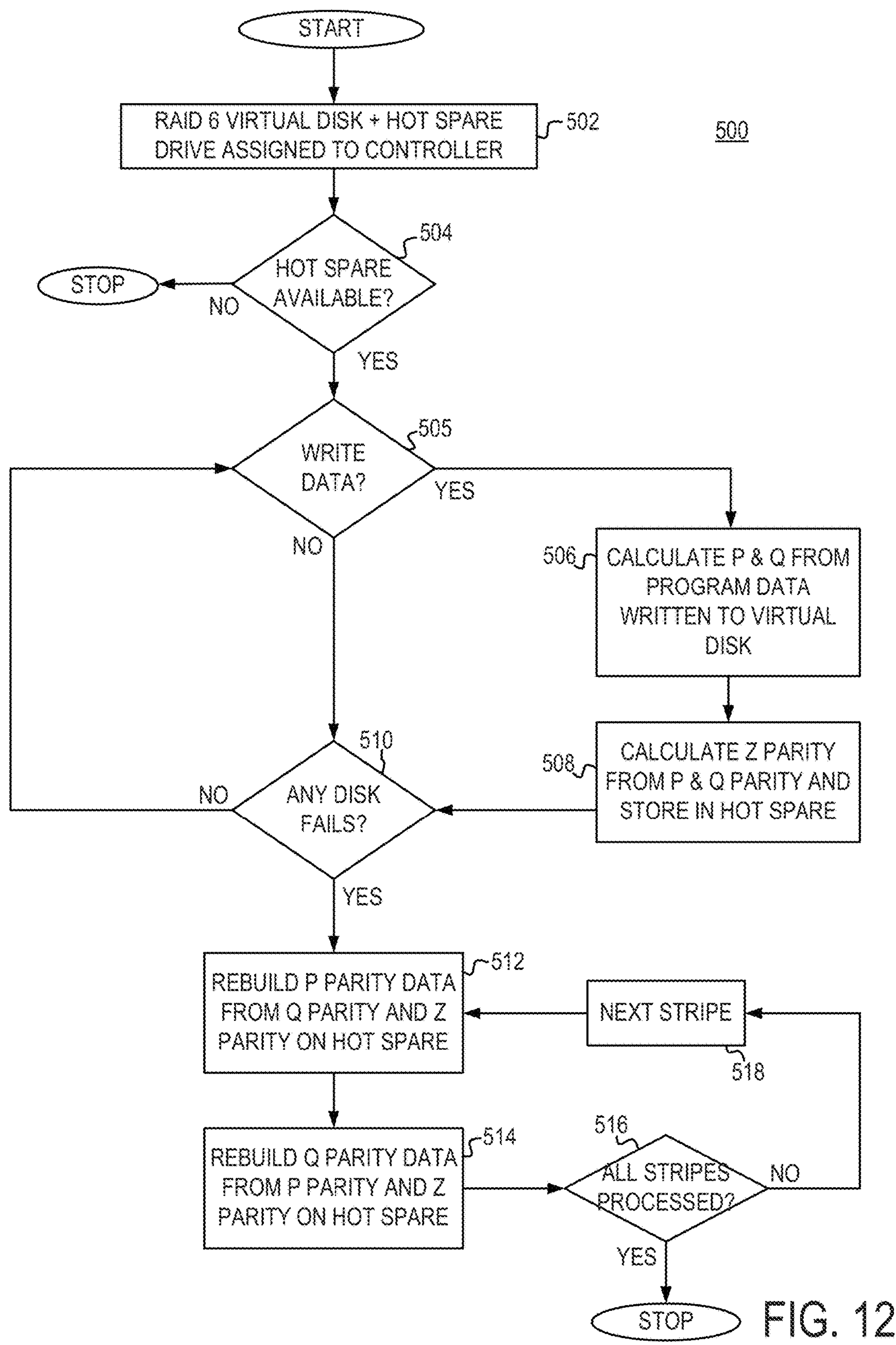
FIG. 12 illustrates a flow diagram of a method of employing a hot spare drive and a Z parity bit to simplify data regeneration following a single drive failure.

FIG. 12 is a flow diagram illustrating a RAID-6 control method 500 or process performed by or corresponding to a RAID controller implementing the RAID-6 configuration described with respect to FIG. 3 through FIG. 11, i.e., RAID-6 with Z parity data. The method 500 illustrated in FIG. 12 begins (block 502) when a RAID-6 virtual disk is assigned to the RAID controller.

The RAID controller performing the method 500 illustrated in FIG. 12 makes an initial determination (block 504) of whether a hot spare drive is available to it and terminates if there is no available hot spare drive. The method 500 of FIG. 12 then awaits (block 505) until data is written to the RAID 6 virtual disk. When a new block of write data arrives, the RAID controller writes the data block into the virtual disk in accordance with a RAID-6 implementation, i.e., the data block is striped across N−2 storage devices, P parity data is calculated based on the corresponding N−2 bits of the block data, and stored on one of the N storage devices, and Q parity data is calculated and stored on the last of the N storage devices Again, the P parity data and Q parity data are originally calculated according to conventional RAID 6 methods.

After generating and storing the P and Q parity data, the method 500 illustrated in FIG. 12 calculates Z parity data by, e.g., performing an XOR of the P parity data and the Q parity data and storing the Z parity data to the applicable stripe of the hot spare drive.

Method 500 then determines (block 510) whether any disk failures have been reported or detected. Until a disk failure is reported or detected, method 500 loops on blocks 505, 506, 508, and 510, writing new data into the virtual disk as it arrives and calculating and storing P, Q, and Z parity data as described.

If a disk failure is detected in block 510. Upon identifying or detecting a disk failure in block 510, the method 500 illustrated in FIG. 12 begins the rebuild process. FIG. 12 emphasizes that, with respect to P parity data and Q parity data stored on the storage disk that subsequently fails, the regeneration process requires only a single, 2-input XORing of the Z parity data with the parity data not stored on the failing storage device. Thus, method 500 illustrates, in operation 512, rebuilding P parity data by XORing Q parity data from the applicable portion of the particular storage device and Z parity from the applicable portion of the hot spare drive. Similarly, operation 514 illustrates rebuilding Q parity data for a particular block by XORing P parity data from the applicable storage device and Z parity data from the applicable portion of the hot spare drive.

Not illustrated in FIG. 12 is the rebuilding of a stripe of the data block that was stored on the failing storage device, i.e., non-parity data. Recognizing that regeneration of a data block stripe is substantially the same as conventional RAID-6 configurations in which original data is regenerated by XORing all non-failing original data and the P parity data.

After P parity data and Q parity data from the failed storage device have been regenerated and stored back to the hot spare drive, the method 500 illustrated in FIG. 500 determines (block 516) whether all stripes of the failed storage device have been regenerated and selecting the next stripe (block 518) and performing the operations of blocks 512 and 514 until, after all of stripes of the failed storage device have been regenerated, the method terminates.

Any one or more processes or methods described above, including processes and methods associated with the FIG. 12 flow diagram, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A redundant array of independent drives (RAID) controller method performed by a RAID controller, the RAID controller method comprising:

responsive to receiving an assignment of a RAID 6 virtual disk comprising N storage drives, determining availability of a hot spare drive;

responsive to detecting an available hot spare drive, performing RAID parity operations comprising;

responsive to receiving write data, performing data storing operations comprising:

storing a block of the write data in D data stripes distributed across D of the N storage drives, where D and N are integers greater than 0 and N is greater than D;

generating P parity data based on the D data stripes and storing the P parity data on one of the N storage drives;

generating Q parity data based on a combination of the D data stripes and the P parity data and storing the Q parity data on one of the N storage drives; and generating Z parity data based on a combination of the P parity data and the Q parity data and storing the Z parity data on a hot spare drive; and responsive to detecting a failed storage drive, performing data regeneration operations comprising:

determining regenerated write data corresponding to write data, if any, previously stored on the failed storage drive, wherein said determining is based upon a combination of the P parity data and write data stored on non-failing storage drives;

determining regenerated P parity data corresponding to the P parity data, if any, previously stored on the failed storage drive, wherein said determining is based upon a combination of the Q parity data and the Z parity data;

determining regenerated Q parity data corresponding to the Q parity data, if any, previously stored on the failed storage drive, wherein said determining is based upon a combination of the P parity data and the Z parity data; and overwriting the Z parity data previously stored on the hot spare drive with the regenerated write data, the regenerated P parity data, and the regenerated Q parity data.

2. The RAID controller method of claim 1, wherein N=D+2.

3. The RAID controller method of claim 1, wherein generating the P parity data comprises performing an XOR of the D data stripes.

4. The RAID controller method of claim 3, wherein generating the Q parity data comprises performing an XOR of a shifted version of each of the D data stripes.

5. The RAID controller method of claim 1, wherein generating the Z parity data comprises performing an XOR of the P parity data and the Q parity data.

6. The RAID controller method of claim 1, wherein the block of the write data comprises a first block of data and wherein the RAID controller method further comprises:

repeating the data storing operations for a second block of the write data, wherein the D data stripes for the second block are distributed across a different set of storage drives than the D data stripes for the first block.

7. The RAID controller method of claim 1, further comprising:

reconfiguring the N−1 non-failing storage drives and the hot spare drive as a virtual storage drive.

8. The RAID controller method of claim 1, wherein the storage drives comprise storage disks.

9. A redundant array of independent drives (RAID) controller, comprising:

a processor; and a memory including processor executable RAID controller instructions for causing the processor to perform RAID controller operations comprising:

responsive to receiving write data, performing storing operations comprising:

storing a block of the write data in D data stripes distributed across D of N storage drives, where N is greater than D;

generating P parity data based on the D data stripes and storing the P parity data on one of the N storage drives;

generating Q parity data based on a combination of the D data stripes and the P parity data and storing the Q parity data on one of the N storage drives; and generating Z parity data based on a combination of the P parity data and the Q parity data and storing the Z parity data on a hot spare drive; and responsive to detecting a failed storage drive, performing data regeneration operations comprising:

determining, based upon two read operations, regenerated P parity data corresponding to the P parity data, if any, previously stored on the failed storage drive;

determining, based upon two read operations, regenerated Q parity data corresponding to the Q parity data previously stored on the failed storage drive; and overwriting Z parity data previously stored on the hot spare drive with the regenerated P parity data and the regenerated Q parity data.

10. The RAID controller of claim 9, wherein determining the regenerated P parity data comprises:

reading the Q parity data;

reading the Z parity data; and determining the regenerated P parity date based upon a combination of the Q parity data and the Z parity data.

11. The RAID controller of claim 9, wherein determining the regenerated Q parity data comprises:

reading the P parity data;

reading the Z parity data; and determining the regenerated Q parity date based upon a combination of the P parity data and the Z parity data.

12. RAID controller of claim 9, wherein N=D+2.

13. The RAID controller of claim 9, wherein generating the P parity data comprises performing an XOR of the D data stripes.

14. The RAID controller of claim 13, wherein generating the Q parity data comprises performing an XOR of a shifted version of each of the D data stripes.

15. The RAID controller of claim 9, wherein generating the Z parity data comprises performing an XOR of the P parity data and the Q parity data.

16. The RAID controller of claim 9, wherein the block of data comprises a first block of data and wherein the RAID controller operations include:

repeating the storing operations for a second block of the write data, wherein the D data stripes for the second block are stored to a different set of D storage drives than the D data stripes for the first block.

17. The RAID controller of claim 9, further comprising:

determining regenerated write data corresponding to write data, if any, previously stored on the failed storage drive, wherein said determining is based upon a combination of the P parity data and write data on non-failing storage drives; and overwriting write data previously stored on the hot spare drive with the regenerated write data, if any, data and the regenerated Q parity data.

18. The RAID controller of claim 9, further comprising:

reconfiguring the N−1 non-failing storage drives and the hot spare drive as a virtual storage drive.

19. A non-transient computer readable medium comprising processor executable redundant array of independent drives (RAID) controller instructions for causing a RAID controller to perform operations comprising:

responsive to receiving an assignment of a RAID 6 virtual disk comprising N storage drives, determining availability of a hot spare drive;

responsive to detecting an available hot spare drive, performing RAID parity operations comprising;

receiving write data including at least one data block of a size corresponding to the product of S and D where S indicates a size of a data stripe and D indicates a number of data stripes;

storing the data block in D data stripes distributed across D of N storage drives, wherein N is greater than D;

storing RAID-6 P parity data on a first of the N storage drives not included in the D storage drives;

storing RAID-6 Q parity data on a second of the N storage drives not included in the D storage drives;

generating Z parity data based on a combination of the P parity data and the Q parity data and storing the Z parity data on a third storage drive not included in the D storage drives.

20. The computer readable medium of claim 19, wherein the third storage drive comprises a hot spare storage drive and wherein the RAID controller operations include:

responsive to detecting a failed storage drive, performing data regeneration operations comprising:

determining regenerated P parity data corresponding to the P parity data, if any, previously stored on the failed storage drive, wherein said determining includes:

performing a first read operation to read the Q parity data;

performing a second read operation to read the Z parity data; and performing an XOR of the Q parity data and the Z parity to obtain the regenerated P parity data; and overwriting a portion of the hot spare storage drive with the regenerated P parity data;

determining regenerated Q parity data corresponding to the Q parity data, if any, previously stored on the failed storage drive, wherein said determining includes:

performing a first read operation to read the P parity data;

performing a second read operation to read the Z parity data; and performing an XOR of the P parity data and the Z parity D data to obtain the regenerated Q parity data; and overwriting a portion of the hot spare drive with the regenerated Q parity data.

* * * * *